US011308154B2

(12) United States Patent
Li et al.

(10) Patent No.: US 11,308,154 B2
(45) Date of Patent: Apr. 19, 2022

(54) METHOD AND SYSTEM FOR DYNAMICALLY OVERLAY CONTENT PROVIDER INFORMATION ON IMAGES MATCHED WITH CONTENT ITEMS IN RESPONSE TO SEARCH QUERIES

(71) Applicant: Baidu USA LLC, Sunnyvale, CA (US)

(72) Inventors: Dong Li, Sunnyvale, CA (US); Yifei Jiang, Sunnyvale, CA (US); Zhuang Li, Sunnyvale, CA (US); Qi Kong, Sunnyvale, CA (US); Fan Zhu, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 789 days.

(21) Appl. No.: 15/239,676

(22) Filed: Aug. 17, 2016

(65) Prior Publication Data
US 2018/0052934 A1 Feb. 22, 2018

(51) Int. Cl.
*G06F 16/58* (2019.01)
*G06F 16/9038* (2019.01)

(52) U.S. Cl.
CPC ...... *G06F 16/5866* (2019.01); *G06F 16/9038* (2019.01)

(58) Field of Classification Search
CPC .... G06F 16/5838; G06F 16/58; G06F 16/583; G06F 16/90335
See application file for complete search history.

(56) References Cited

U.S. PATENT DOCUMENTS

| 8,438,163 B1* | 5/2013 | Li | G06K 9/00536 |
| | | | 707/737 |
| 2011/0131241 A1* | 6/2011 | Petrou | G06F 16/95 |
| | | | 707/770 |
| 2015/0178786 A1* | 6/2015 | Claessens | G06F 16/901 |
| | | | 705/14.66 |

(Continued)

FOREIGN PATENT DOCUMENTS

| CN | 102207953 A | 10/2011 |
| CN | 104462212 A | 3/2015 |

(Continued)

*Primary Examiner* — Etienne P Leroux
*Assistant Examiner* — Cindy Nguyen
(74) *Attorney, Agent, or Firm* — Womble Bond Dickinson (US) LLP

(57) ABSTRACT

In response to a search query received from a client, a content item is identified from a content database based on one or more keywords associated with the search query. In addition, a search is performed in an image store to identify a list of image candidates based on one or more keywords associated with the search query. An image is selected from the list of image candidates using an image selection algorithm. Metadata associated with the content provider is inscribed onto the selected image to generate a customized image. The customized image is integrated with the content item to generate a composite content item such as a poster. As a result, the content represented by the composite content item is closely tied to the content provider. The composite content item is then transmitted to the client.

15 Claims, 10 Drawing Sheets

(56) References Cited

U.S. PATENT DOCUMENTS

| | | | |
|---|---|---|---|
| 2015/0206169 A1* | 7/2015 | Ye | G06Q 30/0242 |
| | | | 705/14.41 |
| 2017/0109785 A1* | 4/2017 | Vidra | G06Q 30/0256 |
| 2018/0012630 A1* | 1/2018 | Thomee | G11B 27/036 |

FOREIGN PATENT DOCUMENTS

| | | |
|---|---|---|
| CN | 104504110 A | 4/2015 |
| CN | 104756046 A | 7/2015 |

* cited by examiner

350

| Content ID 351 | Image Identifier(s) 352 |
|---|---|
| Content Item 1 | Image 1, Image 2, Image 3, Image 4, Image 5 |
| Content Item 2 | Image 1 |
| Content Item 3 | Image 2 |
| Content Item 4 | Image 1, Image 2, Image 4 |
| ... | ... |

| Keyword(s) 301 | Image Identifier(s) 302 |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| ... | ... |

FIG. 3A

| Content/Content Provider ID 601 | Provider Metadata 602 |
|---|---|
| Content Item/Provider 1 | name |
| Content Item/Provider 2 | logo |
| Content Item/Provider 3 | slogan |
| Content Item/Provider 4 | trademark |
| ... | ... |

METHOD AND SYSTEM FOR DYNAMICALLY OVERLAY CONTENT PROVIDER INFORMATION ON IMAGES MATCHED WITH CONTENT ITEMS IN RESPONSE TO SEARCH QUERIES

TECHNICAL FIELD

Embodiments of the invention relate generally to searching content. More particularly, embodiments of the invention relate to dynamically overlaying content provider information on an image matched with a content item in response to a search query.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items. When a content item is presented with an image, the presentation is not strongly tied a content provider that provides the content item. Typically, the image may be extracted from the presentation by an end user.

BRIEF DESCRIPTION OF THE DRAWINGS

Embodiments of the invention are illustrated by way of example and not limitation in the figures of the accompanying drawings in which like references indicate similar elements.

FIGS. 3A-3B are examples of an image mapping table according to certain embodiments of the invention.

FIG. 6 is a block diagram illustrating an example of a content provider metadata database according one embodiment of the invention.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, in response to a search query received from a client, a content item (e.g., text) is identified from a content database based on one or more keywords associated with the search query. In addition, a search is performed in an image store to identify a list of image candidates based on one or more keywords associated with the search query, the content item, and/or a content provider that provides the content item. An image is selected from the list of image candidates using an image selection algorithm. Metadata associated with the content provider (e.g., a name, logo, or slogan) is inscribed onto the selected image to generate a customized image. The customized image is integrated with the content item to generate a composite content item such as a poster. As a result, the content represented by the composite content item is closely tied to the content provider. The composite content item is then transmitted to the client.

Figure 1A:
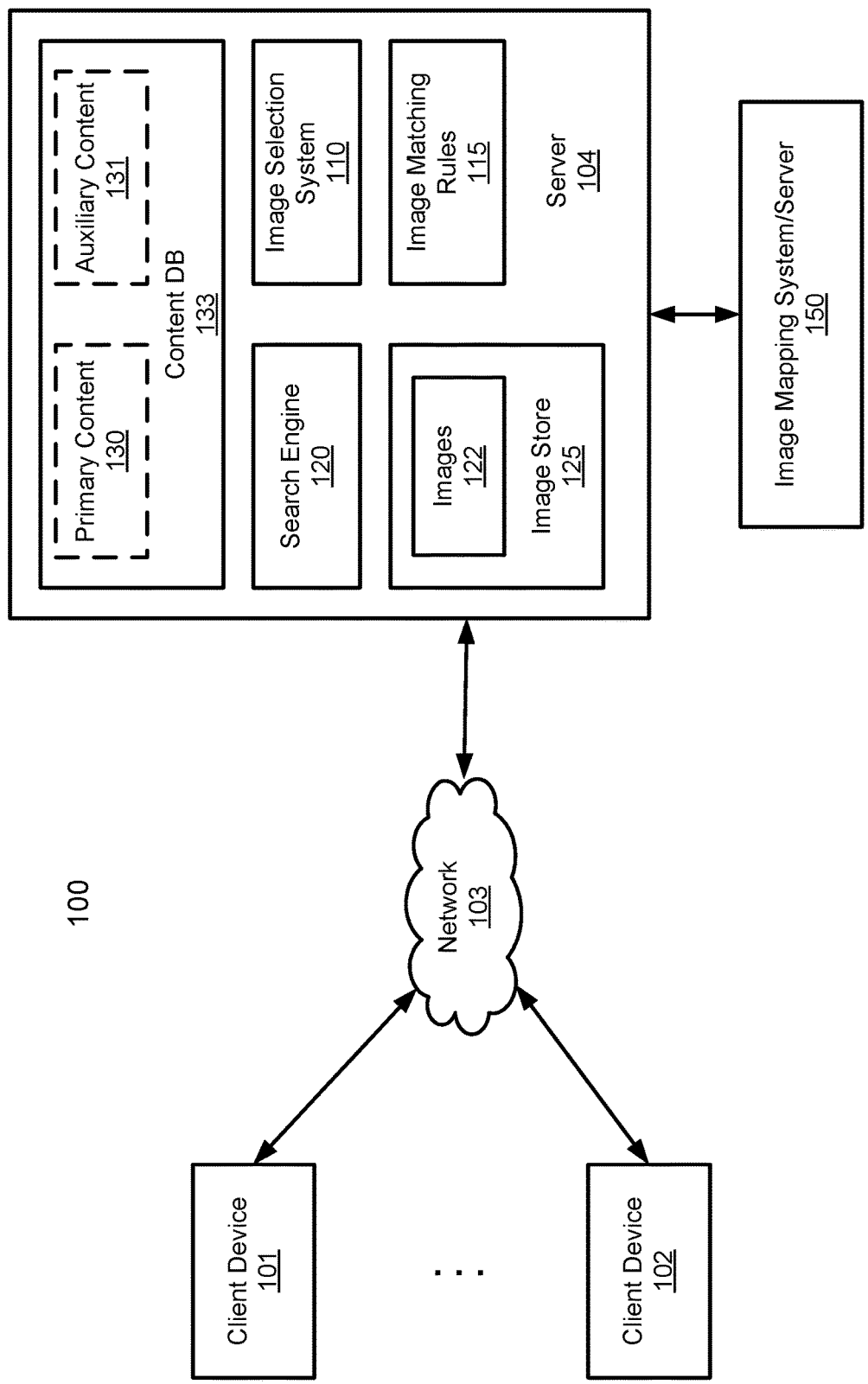
FIGS. 1A and 1B are block diagrams illustrating an example of system configuration for matching images with content items according to some embodiments of the invention.
Figure 1B:
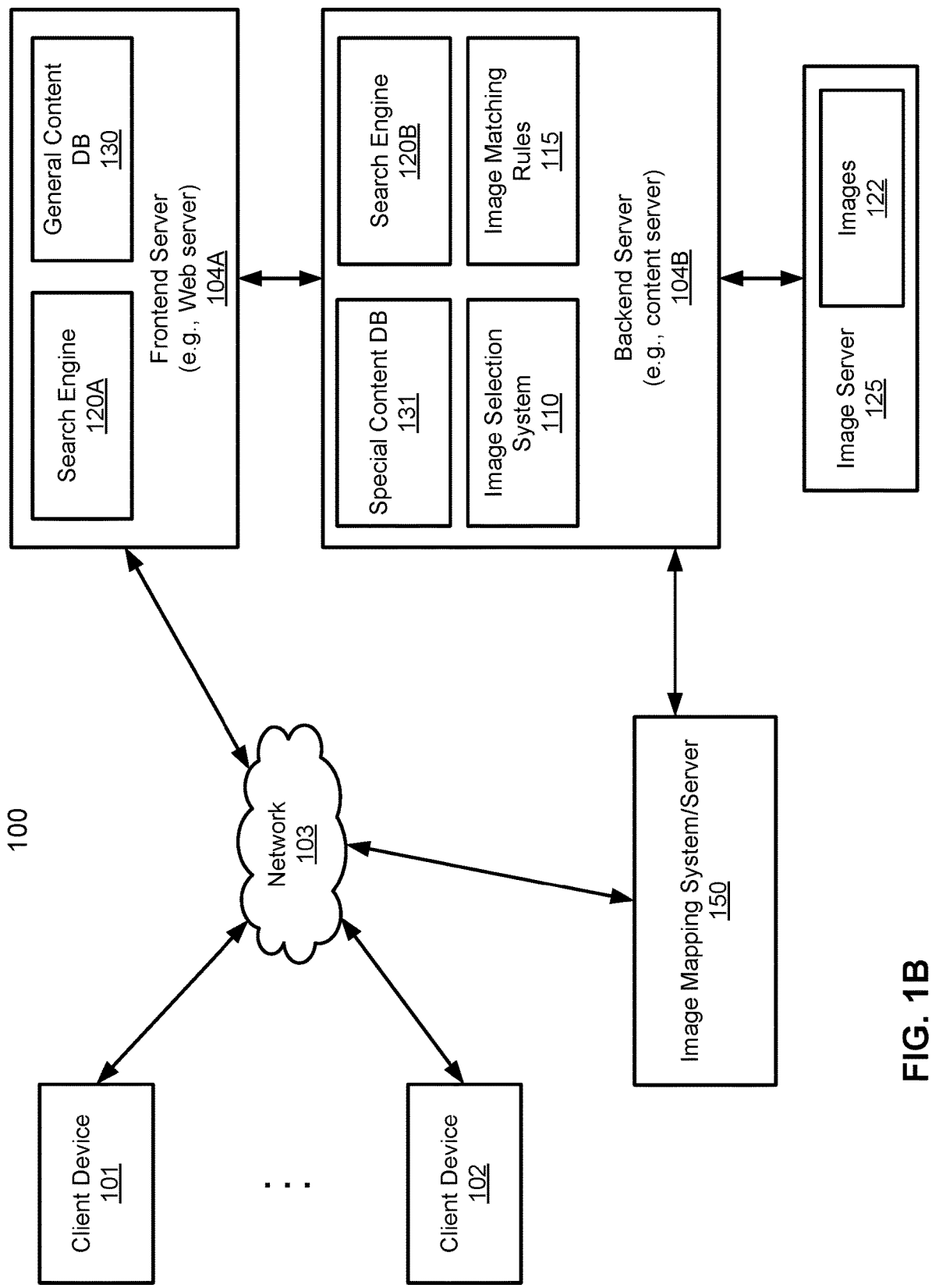

FIGS. 1A and 1B are block diagrams illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120, image selection system 110 (also referred to as an image selection module), and image matching rules 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a client application of client device 101 (e.g., Web browser, mobile application), may send a search query to server 104 and the search query is received by search engine 120 via an interface over network 103. The search query may be received via a variety of communication protocols such as a transport control protocol and Internet protocol (TCP/IP) protocol. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords.

Primary content database 130 (also referred to as a master content database) may be a general content database, while auxiliary content database 131 (also referred to as a secondary or accessory content database) may be a special or sponsored content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called a proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). Alternatively, some of the content items may be sponsored content items provided and sponsored by a variety of content providers as sponsors. In one embodiment, primary content database 130 stores general content items that have been collected by network crawlers (e.g., unsponsored content).

Auxiliary content database 131 stores specific, special, or sponsored content items (e.g., advertisements or Ads) that are associated with specific, known, or predetermined content providers (e.g., advertisers). In one embodiment, in response to a search query, a first set of keywords is determined based on the search query, where the keywords include search terms specified in the search query and keywords semantically related to the search terms. The first set of keywords are then matched with another set or sets of keywords (e.g., bidwords) associated with one or more content providers. If there is a match, a corresponding content item or items are identified and retrieved from auxiliary content database 131. There may be a query keyword to content provider keyword matching data structure or table (not shown) for matching purposes.

In one embodiment, image matching rules 115 includes an image mapping table having a number of mapping entries, each mapping entry mapping one or more keywords to one or more image IDs identifying one or more images, for example, as shown in FIG. 3A. Alternatively, each mapping entry of the image mapping table maps a content ID identifying a particular content item to one or more image IDs, for example, as shown in FIG. 3B. Thus, image candidates can be identified based on keywords associated with a search query and/or a content item found in response to the search query. Alternatively, image candidates can be identified based on a content ID of the content item.

Image matching rules 115 may be implemented in a variety of data structures such as a table or database. Based on the image IDs, a list of image candidates can be identified and retrieved from images 122 stored in image store 125, where image store 125 may also store image metadata (not shown) describing images 122. In one embodiment, images 122 and their respective metadata may be obtained by one or more image or network crawlers that are designed to craw the networks to collect images as well as their surrounding metadata. Images 122 may be non-privileged, non-copyrightable, properly licensed images, or any other authorized images.

According to one embodiment, image matching rules 115 may be previously compiled and generated prior to receiving the search query (e.g., offline). The set of image matching rules 115 is configured to map one or more keywords to one or more image IDs identifying one or more images. The keywords may be identified as the keywords that are more likely be used in search queries, keywords associated with certain content items, and/or keywords associated with certain content providers. Such keywords may be identified based on an analysis or tracking of user searching activities or search history, which may be compiled for a period of time.

Subsequently when a search query is received online by search engine 120 from a client device for searching content, a search is performed in content database 133 to retrieve a list of content items. In addition, for at least one of the content items, an analysis is performed, for example, by image selection system 110, on the search query, the content item, and/or a content provider providing the content item, to determine a set of keywords. The keywords may include one or more keywords associated with the search query (e.g., search terms), one or more keywords associated with the content item (e.g., obtained from a title and/or description of the content item), and/or one or more keywords (e.g., bidwords) associated with the content provider providing the content item. The keywords may further include certain keywords that are semantically similar or have the same meaning of the original keywords (e.g., synonymous words or phrases). Based on the keywords, a list of one or more images are identified from image store 125 using the set of image matching rules 115.

According to one embodiment, the identified images may be ranked by image selection system 110, using a variety of ranking algorithms or ranking models, which have been generated and configured by image mapping system 150. For at least one of the content items found in content database 133, an image is selected from the list of image candidates to be associated with the content item. The selected image may be incorporated with the content item to generate an incorporated or composite content item. For example, the selected image may serve as a background image to the content item or alternatively, the selected image may be positioned complementing or alongside the content item. The list of incorporated content items and images is returned to client device 101 as part of a search result.

According to one embodiment, in response to a search query received from a client such as client device 101, search engine 120 searches in content database 133 to identify a content item (e.g., text) based on one or more keywords associated with the search query. In addition, image selection system 110 searches in image store 125 to identify a list of image candidates based on one or more keywords associated with the search query, the content item, and/or a content provider that provides the content item. Image selection system 110 selects an image from the list of image candidates using an image selection algorithm, which may be a part of image matching rules 115. Metadata associated with the content provider (e.g., a name, logo, or slogan) is inscribed onto the selected image to generate a customized image. The inscribed metadata may be preselected or specified by the content provider, which may be stored as part of image matching rules 115. Alternatively, the metadata can be automatically selected by image selection system 110 dependent upon the type of content item and/or image, as well as certain user context (e.g., user preference, habits) of a user associated with the client at the point in time. The customized image is integrated with the content item to generate a composite content item such as a poster. As a result, the content represented by the composite content item is closely tied to the content provider. The composite content item is then transmitted to the client.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server.

Referring now to FIG. 1B, in this embodiment, search engine 120A and primary or general content database 130 may be maintained in frontend server 104A, which may be a Web server. In response to a search query, search engine 120A of frontend sever 104A searches in general content database 130 to identify a list of general content items (e.g., a list of URLs of Web pages) based on one or more keywords of the search query. In addition, search engine 120A sends a request (together with the search query) to backend server 104B for a special content item. In response to the request, search engine 120B of server 104B searches in special content database 131 to identify a list of one or more special content items (e.g., Ads). Search engine 120B may perform a lookup operation in a content index (not shown) that maps one or more keywords (e.g., bidwords) to one or more content items provided by one or more content providers (e.g., advertisers). For each of the identified special content items, image selection system 110 searches and matches an image with the special content item as described above. In one embodiment, server 104B is an Ad server.

Similarly, image selection system 110 and auxiliary or special content database 131 may be maintained in a backend server 104B such as an application server or other types of backend servers. Image mapping system 150 (operating as a data analytics server) may also be implemented as a separate server, which is responsible for creating image matching rules 115 based on the content items and their respective associated keywords of content database 130 and/or database 131. Image store 125 may be maintained and hosted in a separate server as an image server having an image searching engine therein, which may be organized and provided by the same entity or organization as of server 104A and/or sever 104B. Alternatively, image server 125 may be maintained or hosted by separate entities or organizations (e.g., third-party providers), which are responsible for collecting images 122 and their metadata.

Also note that general content database 130 may also be implemented or maintained in a separate content server, referred to as a primary content server. Similarly, special content database 131 may be implemented or maintained in a separate content sever, referred to as an auxiliary or accessory content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) may be matched with the images obtained from image store/server 125, while content items obtained from primary content database 130 (e.g., general content) may be returned to the client device without modification as part of the search result.

Figure 2:
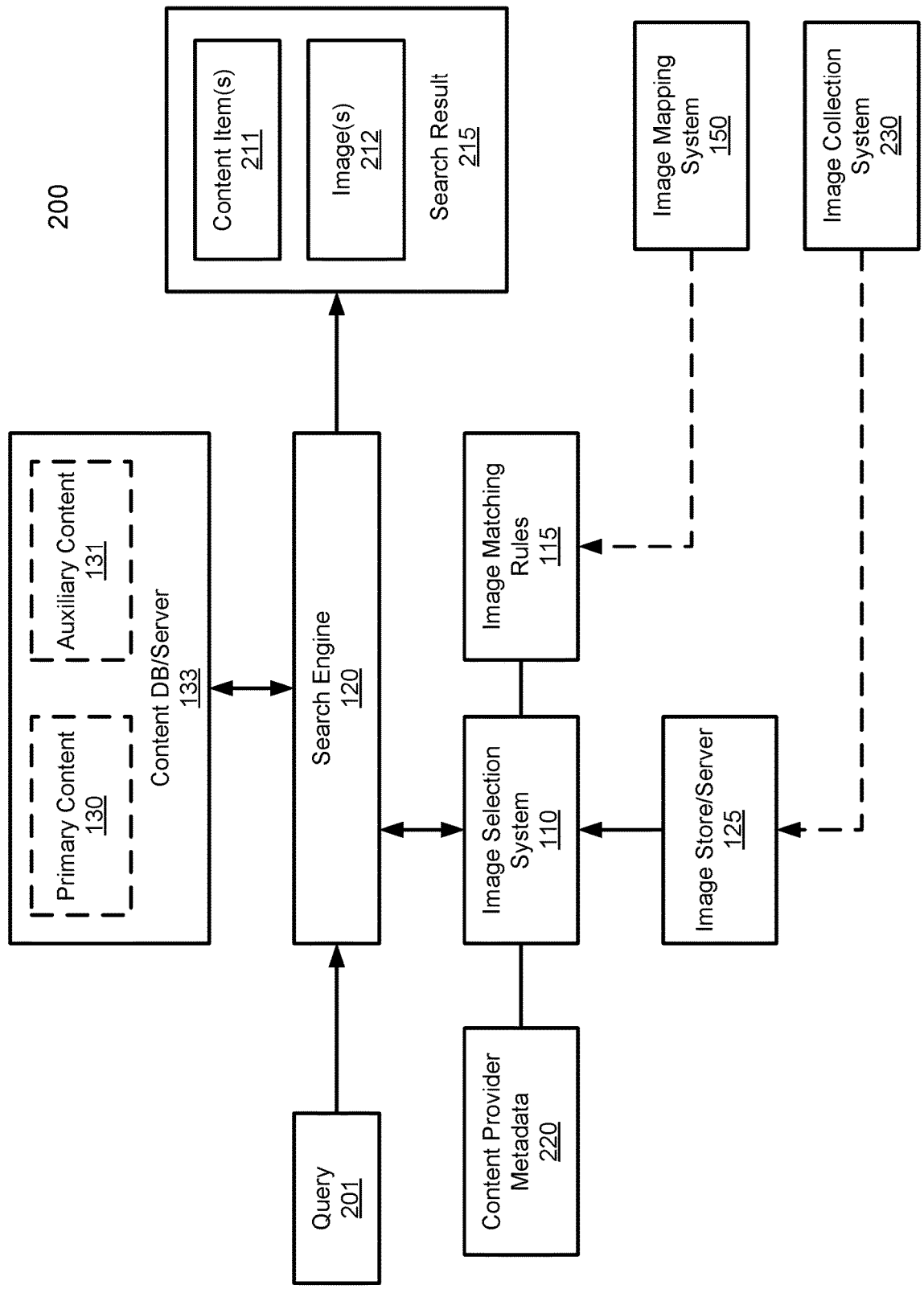
FIG. 2 is a block diagram illustrating an example of an image selection system according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a first search in content database or content server 133 to identify and retrieve a first list of content items based on one or more keywords or search terms associated with search query 201. In addition, for at least one of the content items, search engine 120 communicates with image selection system 110 to identify a list of images from image store or image sever 125 based on the keywords associated with search query 201 and/or the content item and its content provider using a set of image matching rules 115. Search engine 120 and/or image selection system 110 may perform an analysis on the search query and the content item/content provider to derive a list of keywords. The searches performed in content database/server 133 and/or image store/server 125 may be performed on the list of expanded keywords expanded from the original keywords based on an analysis (e.g., a latent semantic analysis).

In one embodiment, image selection system 110 and/or image matching rules 115 may be integrated with search engine 120. Image matching rules 115 may be previously configured or compiled, for example, by image mapping system 150 as a data analytics system. Image mapping system 150 may be hosted in a separate system or server communicatively coupled to system 200 via an API or over a network. Image mapping system 200 may include a user interface to allow a user or an administrator to configure a set of image matching rules, which may then be expanded and ranked using a predetermined algorithm by processing logic.

Similarly, images stored in image store/server 125 may be collected by image collection system 230, which may be a separate system or server communicatively coupled to system 200 over a network. Image mapping system 150 and/or image collection system 230 may be operated by the same or different entity or organization as of system 200. In this example, at least a portion of the images may be cached and stored in a local image store with respect to system 200 (e.g., local to server 104). Alternatively, images may be maintained by a designated server associated with image collection system 230, with which image selection system 110 communicates to identify and retrieve the list of images via an API.

Based on the list of images retrieved from image store/server 125, image selection system 110 ranks the images according to a ranking algorithm. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching techniques described throughout this application to complement or describe content item 211, or vice versa, in an appropriate manner. For example, the content of content item 211 is related to the content as shown in image 212, or vice versa. The integrated images 212 and content items 211 may be returned to the client device as a part of search result 215. Note that some or all of the components or modules as shown in FIG. 2 may be implemented in software, hardware, or a combination thereof.

According to one embodiment, in response to search query 201 received from a client such as client device 101, search engine 120 searches in content database 133 to identify a content item (e.g., text as part of an advertisement or Ad) based on one or more keywords associated with the search query. In addition, image selection system 110 searches in image store 125 to identify a list of image candidates based on one or more keywords associated with the search query, the content item, and/or a content provider (e.g., an advertiser) that provides the content item. Image selection system 110 selects an image from the list of image candidates using an image selection algorithm, which may be a part of image matching rules 115. Metadata 220 associated with the content provider (e.g., a name, logo, slogan, or some other marketing phrases) is inscribed onto the selected image to generate a customized image. Metadata 220 may be preselected or specified by the content provider, which may be stored as part of image matching rules 115. Alternatively, metadata 220 can be automatically selected by the system dependent upon the type of content item and/or image, as well as certain user context (e.g., user preference, habits) of a user associated with the client at the point in time. The customized image is integrated with the content item to generate a composite content item such as a poster. As a result, the content represented by the composite content item is closely tied to the content provider. The composite content item is then transmitted to the client.

FIGS. 3A and 3B are examples of image mapping tables according to certain embodiments of the invention. Referring to FIG. 3A, in this example, image mapping table 300 is a keyword-to-image (keyword/image) mapping table, which may represent at least a portion of image matching rules 115 as described above. In one embodiment, keyword/image mapping table 300 includes a number of mapping entries. Each mapping entry maps one or more keywords 301 to one or more image IDs 302. Image IDs 302 identify the corresponding images in an image store or image server, such as image store/sever 125. Mapping table 300 is indexed based on the keywords. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

Referring now to FIG. 3B, in this example, image mapping table 350 is a content-to-image (content/image) mapping table, which may represent at least a portion of image matching rules 115 as described above. In one embodiment, content/image mapping table 350 includes a number of mapping entries. Each mapping entry maps content ID 351 to one or more image IDs 352. Content ID 351 identifies a content item, which may be identified and retrieved from content databases 130-131. Image IDs 352 identify the corresponding images in an image store or image server, such as image store/sever 125. Mapping table 350 is indexed based on the content IDs. When a content item has been identified in response to a search query, based on a content ID or content item ID identifying the content item, one or more images can be identified using content/image mapping table 350. Note that throughout this application, the terms of "matching rule," "mapping rule," "matching table," and "mapping table" are interchangeable terms for the purposes of illustration. However, they can be implemented in a variety of data structures or formats.

Figure 4:
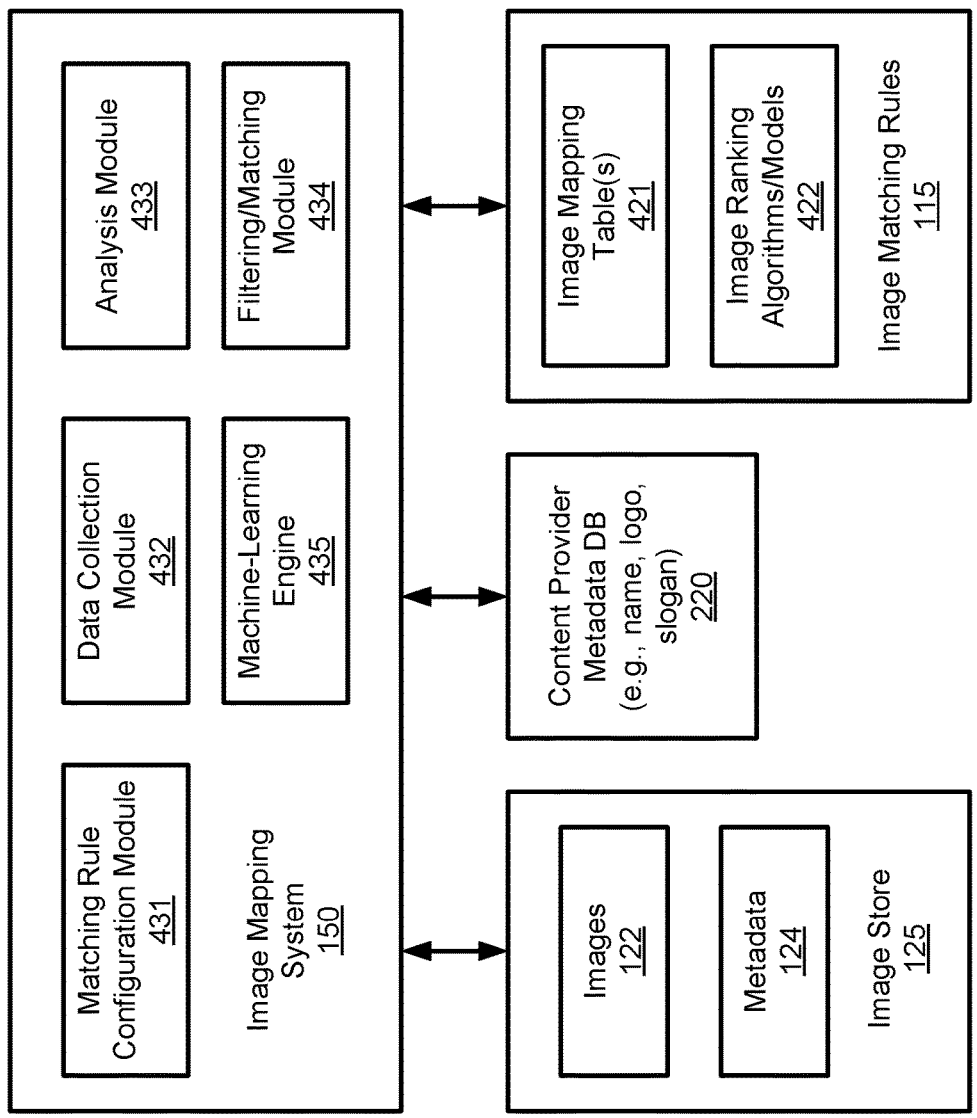
FIG. 4 is a block diagram illustrating an image mapping system according to one embodiment of the invention.

FIG. 4 is a block diagram illustrating an image mapping system according to one embodiment of the invention.

System 400 may be implemented as part of system or sever 150 of FIGS. 1A-1B. Referring to FIG. 4, system 400 includes, but is not limited to, image mapping system 150, image store 125, and image matching rules 115. In one embodiment, system 400 is utilized to configure and generate a set of image matching rules 115 to map certain keywords to images stored in image store 125.

Image store 125 may be maintained locally or remotely in a designated server over a network. The keywords utilized in mapping in image matching rules 115 may be the keywords that are more likely used in search queries. Image store 125 stores images 122 and their respective metadata 124. Image matching rules 115 include image mapping tables 421 and image ranking algorithms or models 422. Image mapping tables 421 may be implemented as any of mapping tables as shown in FIGS. 3A and 3B.

In one embodiment, image mapping system 150 includes matching rule configuration module 431, data collection module 432, analysis module 433, matching module 434, and machine-learning engine or training module 435. Modules 431-435 may be implemented in software, hardware, or a combination thereof. In one embodiment, configuration module 431 may be utilized to configure image mapping table 421, for example, in response to a user request via a user interface. Image mapping table 421 includes a number of mapping entries. Each mapping entry maps a keyword or content ID to one or more image IDs identifying one or more of images 122 stored in image store 125. Images 122 and metadata 124 may be periodically collected and updated by data collection module 432. Data collection module 432 may employ some Web crawlers to craw and collect the images and their surrounding information or metadata 124.

In one embodiment, metadata 124 includes a variety of information or data describing images 122, where metadata may be obtained or collected by a designated data collection module or system, such as data collection module 432. For example, image metadata may be collected at the time of a corresponding image is obtained. The image metadata may include a source from which the image is collected and a time of the collection. A source from which an image is obtained may be a Web page or a document in which the image is attached. An address such as a universal resource locator (URL) of the source page may be collected. In addition, an analysis may be performed on the content of the source page to determine the content possibly represented by the image.

An image recognition may also be performed on the image to determine the content of the image (e.g., whether the image is about a person, an object, landscape, texts, or a combination thereof). In addition, attributes of the image, such as an aspect ratio, pixel counts, brightness, contrast, time of the image taken, and style (e.g., landscape vs. portrait, size of the image), may also be collected. Further, prior user interactions with the image and/or keyword in the past (e.g., a click through rate) may also be determined based on the history interactions associated with the image. These information may be compiled as part of metadata of the images 124, also referred to as features of the images for the purpose of scoring.

Based on the metadata, filtering and matching module 434 performs a filtering operation to determine whether a particular keyword sufficiently describing the image by matching the semantic meanings between the keyword and the metadata of a particular image. For example, if a keyword appears in a source page from which the image was collected, the keyword is related to the image. Similarly, if a keyword describes at least a portion of content of the image in response to an image recognition, the keyword may be related. If it is determined that a keyword does not sufficiently describes a particular image or vice versa based on the analysis on the metadata, that particular image may be removed. If it is determined that the prior user interactions with a particular image is below a predetermined threshold (e.g., fewer user interactions, less user interest or unpopular), that particular image may be removed from image mapping table 421.

In one embodiment, analysis module 433 performs an analysis on at least metadata 124 of images 122 to extract or obtain various image features associated with images 122 and their metadata 124. Based on the analysis, a set of feature scoring formulas or algorithms are determined based on the features of the images such as those listed above. For each of the features, a scoring formula or algorithm may be generated. In addition, a matching quality scoring formula or algorithm is also determined. Alternatively, the features and/or features scores may be trained or learned by machine learning engine 435 to create a ranking model to determine a ranking score for a particular image. These algorithms and/or models can then be stored as part of image ranking algorithms/models 422, which can be utilized online to rank the image candidates to be matched with a content item in response to a search query. The image candidates may be identified using image mapping table 421 in response to a search query.

According to one embodiment, system 400 further maintains content provider metadata database 220 to store the metadata associated with content providers that provide content items. Content provider metadata database 220 may be implemented in a variety of data structures such as a mapping table as shown in FIG. 6. The metadata stored in content provider metadata database 220 may be configured by administrators of the associated content providers, for example, by configuration module 431 via a configuration interface (not shown). Content provider metadata database 220 is then uploaded onto an online system such as server 104 and periodically updated from system 400.

Figure 5:
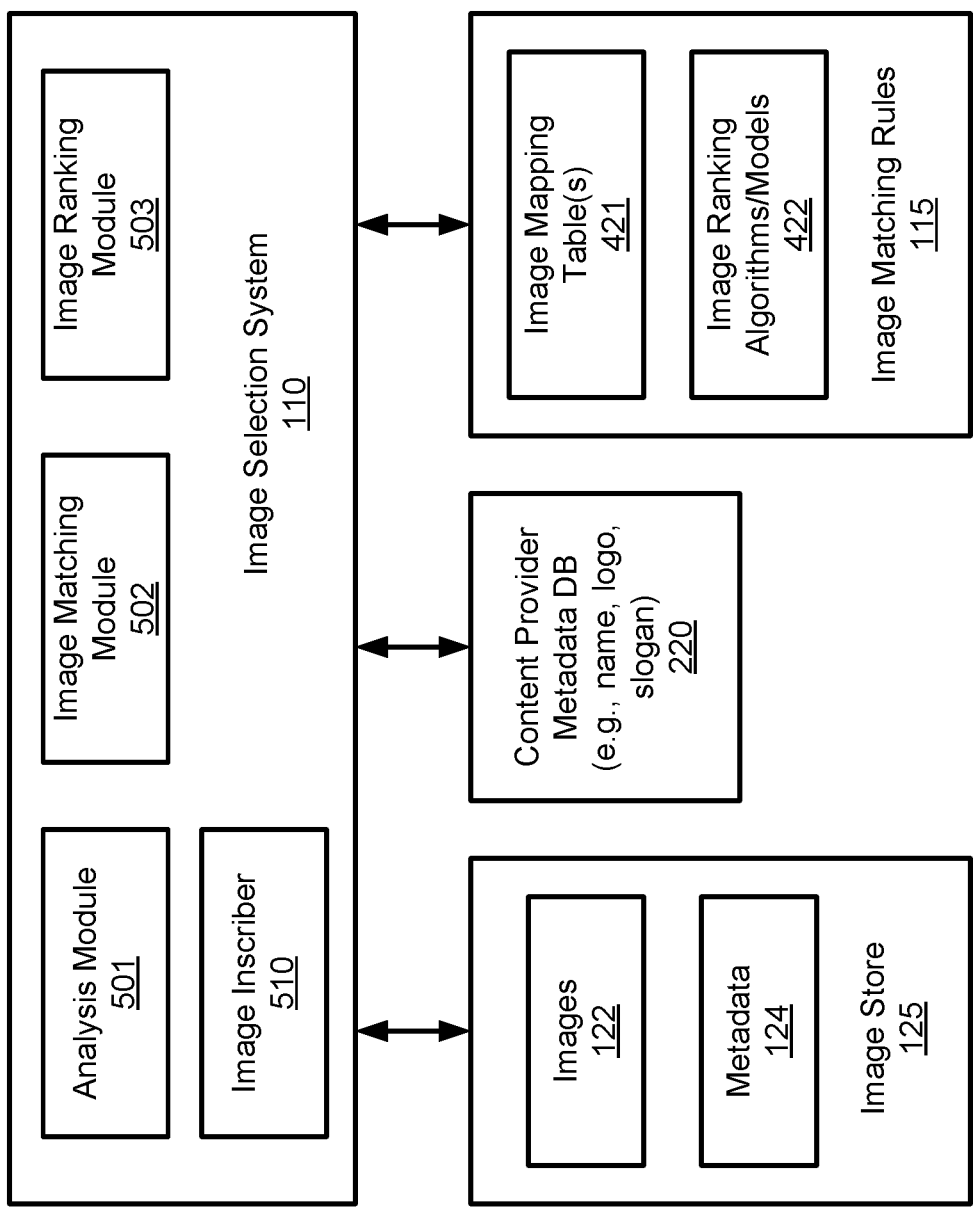
FIG. 5 is a block diagram illustrating an example of an image matching system according to one embodiment of the invention.

FIG. 5 is a block diagram illustrating an example of an image matching system according to one embodiment of the invention. System 500 may be implemented as part of system 200 of FIG. 2. Referring to FIG. 5, system 500 may be incorporated with system 200 of FIG. 2. Alternatively, system 500 may be implemented as a standalone system or a server communicatively coupled to system 200 of FIG. 2, for example, via an API or a communication protocol over a network or a connection. In one embodiment, system 500 is responsible for identifying, ranking, and selecting images to be matched with content items found in response to a search query at runtime, in response to a search query for searching content.

In one embodiment, image selection system 110 includes analysis module 501, image matching module 502, and image ranking module 503, where some or all of these modules may be implemented in software, hardware, or a combination thereof. In one embodiment, in response to a search query received from a client device for searching content, the search query is analyzed by analysis module 501 to determine one or more keywords. For a given content item to be matched with an image, analysis module 501 also analyzes the content and the associated content provider to generate additional keywords. Analysis module 501 may extract one or more keywords from the content item summarizing or describing the content item. Analysis module 501 may determine one or more keywords representing or describing the content provider (e.g., logo). Analysis module

501 may further perform a latent semantic analysis on the keywords to expand the keywords to include one or more keywords that are semantically related.

A search or lookup operation is performed by image matching module 502 in image mapping table 421 based on the keywords or content IDs (e.g., mapping tables as shown in FIGS. 3A and 3B). For each of the images identified as image candidates, a ranking process is performed by image ranking module 503 to determine a ranking score for the image. The images may be ranked or sorted based on image ranking algorithms or models 422, which may be configured by system 400 of FIG. 4 as described above. An image ranked higher than a predetermined threshold may be selected to be matched with a content item.

In addition, according to one embodiment, image selection system 110 further includes metadata inscriber 510 to identify and select metadata associated with a content provider that provides the content item from content provider metadata database 220. Metadata inscriber 510 inscribes or imprints the selected metadata onto the selected image to generate a customized image. The customized image can be integrated with content item subsequently to generate a composite content item such as a poster to be presented to a user of a client. The inscribed metadata can be a name, a logo, a trademark, a service mark, and/or a marketing phrase associated with a content provider.

FIG. 6 is a block diagram illustrating an example of a content provider metadata database according one embodiment of the invention. Referring to FIG. 6, in this example, content provider metadata mapping table 600 may be implemented as a part of content provider metadata database 220. In one embodiment, mapping table 600 includes a number of mapping entries. Each mapping entry maps content ID and/or content provider ID 601 to metadata 602 to be inscribed. Content provider ID 601 identifies a content provider that provides one or more content items. Alternatively, each mapping entry maps a content ID of a content item to metadata 602, as a content provider may provide multiple content items and each content item may be associated with different metadata to be inscribed.

Figure 7:
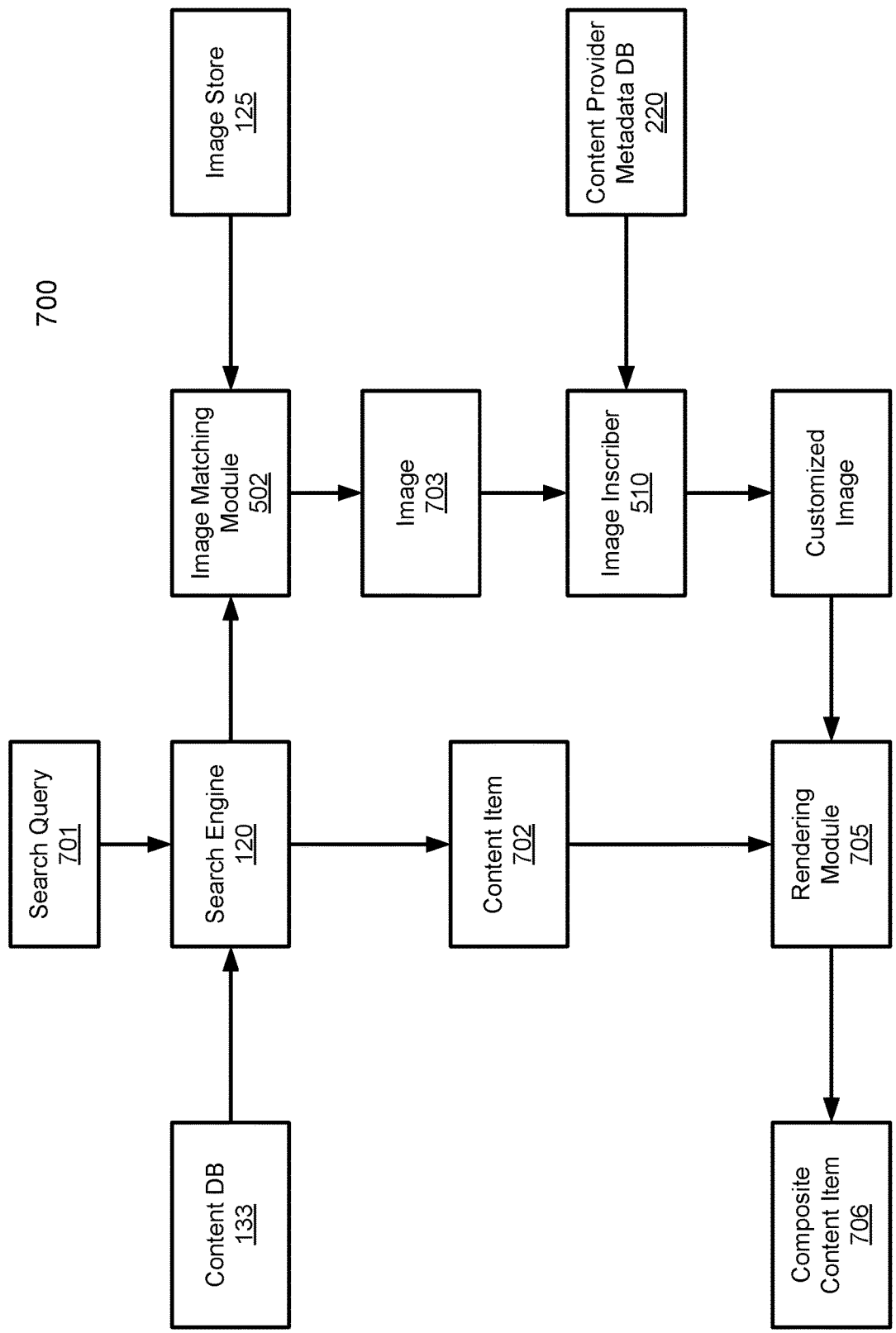
FIG. 7 is a processing flow illustrating a process of matching a content item with an image according to one embodiment of the invention.

FIG. 7 is a processing flow illustrating a process of matching a content item with an image according to one embodiment of the invention. Processing flow 700 may be performed by system 500 of FIG. 5. Referring to FIG. 7, in response to search query 701, search engine 120 searches in content database 133 based on one or more keywords associated with search query 701 to identify content item 702. In addition, image selection system 110 searches in image store 125 based on one or more keywords associated with search query 701, content item 702, and/or a content provider providing content item 702 to obtain image 703. Image inscriber 510 identifies and obtains metadata from content provider metadata database 220. Image inscriber 510 inscribes or imprints the metadata onto image 703 to generate a customized image 704. The metadata can be any one or more of a name, logo, slogan, trademark, service mark, marketing phrase, or any other terms with secondary meaning with respect to the content provider. Based on content item 702 and customized image 704, rendering module 705 renders composite content item 706. Rendering module 705 may be implemented as part of search engine 120.

Figure 8:
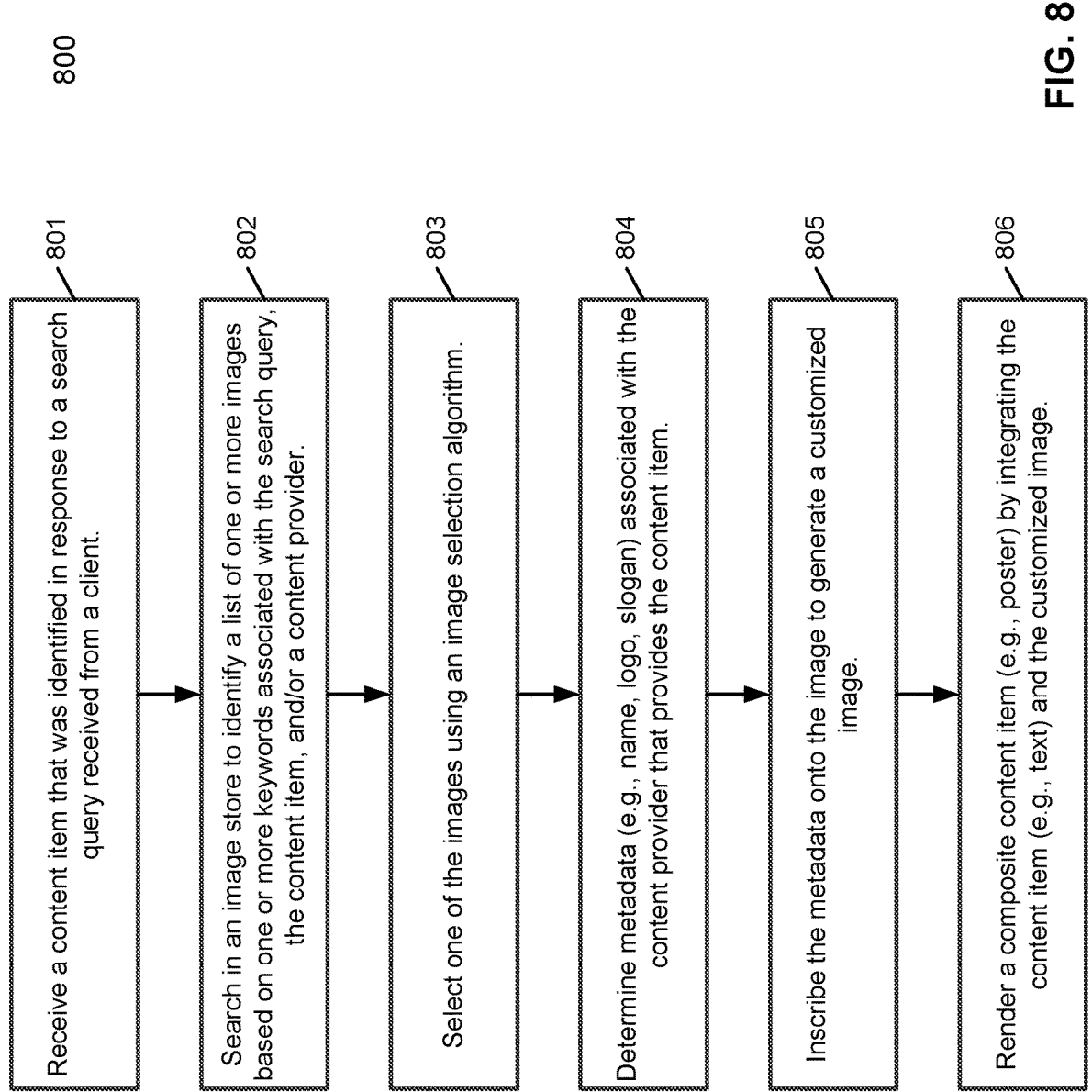
FIG. 8 is a flow diagram illustrating a process of matching images with content according to one embodiment of the invention.

FIG. 8 is a flow diagram illustrating a process of matching images with content according to one embodiment of the invention. Process 800 may be performed by processing logic which may include software, hardware, or a combination thereof. For example, process 800 may be performed by image selection system 110. Referring to FIG. 8, at block 801, processing logic receives a content item (e.g., text) that was identified in response to a search query received from a client. At block 802, processing logic searches in an image store to identify a list of one or more images based on one or more keywords associated with the search query, the content item, and/or a content provider that provides the content item. At block 803, one of the images is selected using an image selection algorithm. At block 804, processing logic determines metadata (e.g., name, logo, and/or slogan) associated with the content provider. At block 805, the metadata is inscribed onto the selected image to generate a customized image. At block 806, a composite content item is rendered having the content item and the customized image therein.

The techniques described above can be applied to matching images with sponsored content. One type of the sponsored content is advertisement (Ad). For example, referring back to FIGS. 1A-1B, content database (DB) or server 133 may be an Ad database or part of an Ad system or server. Each of the content items, e.g., Ads, is associated with a list of predefined keywords, terms, phrases, or sentences. These predefined keywords, terms, phrases, or sentences may be bidwords purchased, defined or specified by an advertiser. In another embodiment, primary content DB 130 may store the general content generally available in a public network. Auxiliary content DB 131 may be an Ad DB, while image selection system/system 110 may be an Ad system communicatively coupled to search engine 120. In response to a search query, search engine 120 searches primary content DB 130 to identify a list of general content items (e.g., URLs of Web pages). Search engine 120 then communicate with the Ad system to identify and retrieve one or more Ads with matching images as described above. The general content items and the Ads with matching images are then returned by search engine 120 to a client as part of a search result. Some of the Ads may be just plain texts. By matching and integrating an image with the Ads, for example, as a background image, the Ads may be more appealing or attractive to users. Server 104 may be a Web server for searching content or alternatively, server 104 may be an Ad server.

Figure 9:
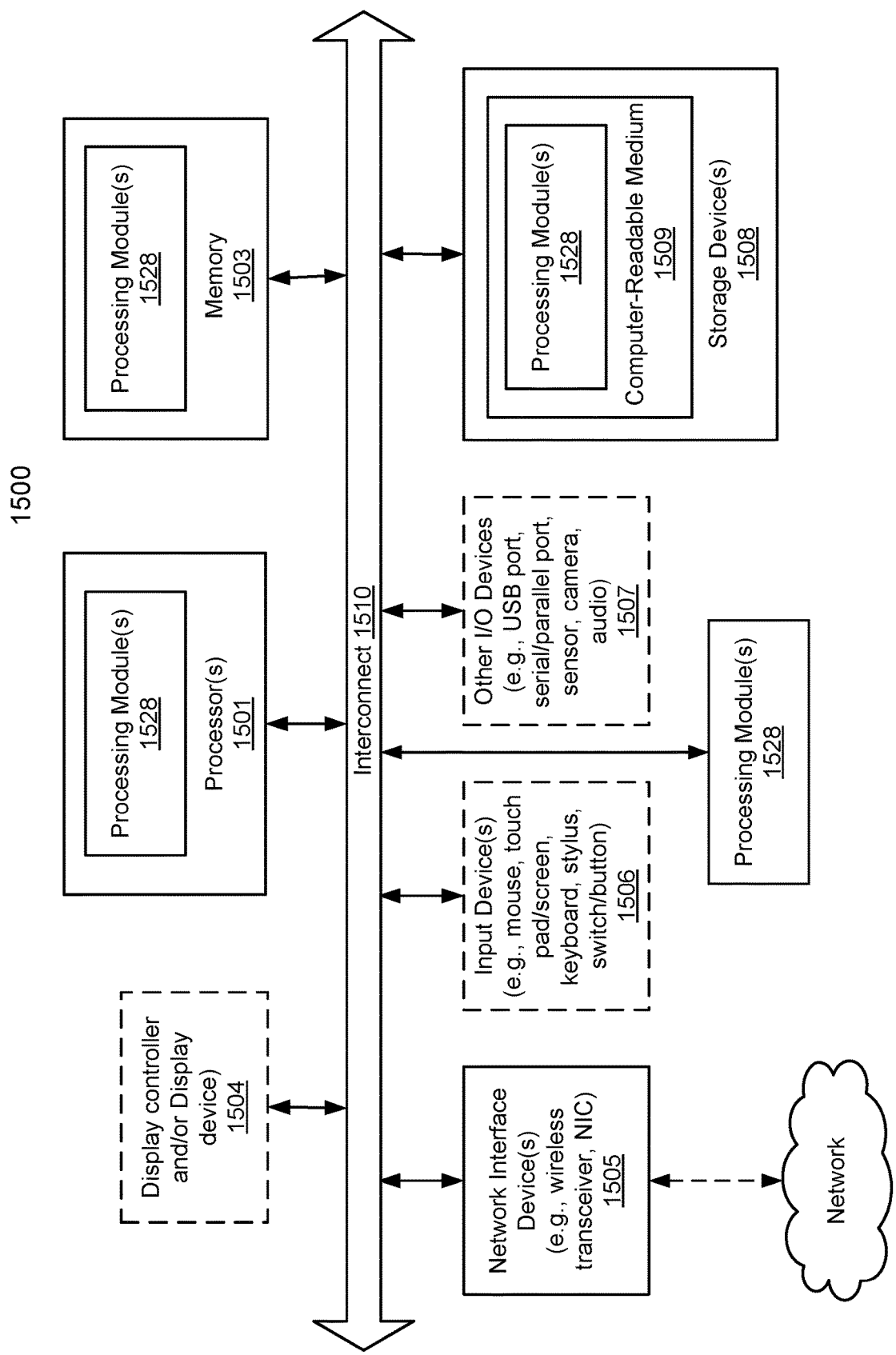
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, a client device or a server described above, such as, for example, any of clients 101-102, server 104, or image mapping system/server 150, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, a search engine, an image selection system as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store at least some of the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for matching images with content items, the method comprising:
   receiving a content item including text, that was identified in response to a search query received from a client;
   searching in an image store using an image selection algorithm which is a part of a set of image matching rules, based on one or more keywords associated with the search query to identify a list of one or more image candidates, including ranking each of the identified image candidates, wherein the set of image matching rules includes a keyword-to-image image mapping table, wherein each mapping entry maps one or more keywords to one or more image identifiers;
   selecting one of the identified image candidates to be matched with the content item by selecting an image from the identified image candidates which is ranked above a predetermined threshold, the selected image serving as a background image to the text of the content item;
   performing a lookup operation in a content provider to metadata (content provider/metadata) mapping table based on a content provider identifier identifying the content provider to identify metadata to be inscribed, wherein the content provider/metadata mapping table comprises a plurality of mapping entries, each mapping entry mapping a content provider ID to a set of metadata to be inscribed on an image to be matched with a content item provided by the corresponding content provider;
   inscribing the metadata on the selected image to generate a customized image, the metadata including information describing a content provider that provides the content item, wherein the inscribed metadata is preselected or specified by the content provider, which is stored as a part of the set of image matching rules; and
   incorporating the content item with the customized image to generate a composite content item to be transmitted to the client.

2. The method of claim 1, wherein selecting one of the identified images to be matched with the content item is performed further based on one or more keywords that are associated with the content item or the content provider.

3. The method of claim 1, wherein the metadata inscribed on the selected image comprises a logo of the content provider.

4. The method of claim 1, wherein the metadata inscribed on the selected image comprises a predetermined phrase or sentence associated with the content provider.

5. The method of claim 1, wherein the metadata inscribed on the selected image comprises a name associated with the content provider.

6. A non-transitory machine-readable medium having instructions stored therein, which when executed by a processor, cause the processor to perform operations of matching images with content items, the operations comprising:
receiving a content item including text, that was identified in response to a search query received from a client;
searching in an image store using an image selection algorithm which is a part of a set of image matching rules, based on one or more keywords associated with the search query to identify a list of one or more image candidates, including ranking each of the identified image candidates, wherein the set of image matching rules includes a keyword-to-image image mapping table, wherein each mapping entry maps one or more keywords to one or more image identifiers;
selecting one of the identified image candidates to be matched with the content item by selecting an image from the identified image candidates which is ranked above a predetermined threshold, the selected image serving as a background image to the text of the content item;
performing a lookup operation in a content provider to metadata (content provider/metadata) mapping table based on a content provider identifier identifying the content provider to identify metadata to be inscribed, wherein the content provider/metadata mapping table comprises a plurality of mapping entries, each mapping entry mapping a content provider ID to a set of metadata to be inscribed on an image to be matched with a content item provided by the corresponding content provider;
inscribing the metadata on the selected image to generate a customized image, the metadata including information describing a content provider that provides the content item, wherein the inscribed metadata is preselected or specified by the content provider, which is stored as a part of the set of image matching rule; and
incorporating the content item with the customized image to generate a composite content item to be transmitted to the client.

7. The machine-readable medium of claim 6, wherein selecting one of the identified images to be matched with the content item is performed further based on one or more keywords that are associated with the content item or the content provider.

8. The machine-readable medium of claim 6, wherein the metadata inscribed on the selected image comprises a logo of the content provider.

9. The machine-readable medium of claim 6, wherein the metadata inscribed on the selected image comprises a predetermined phrase or sentence associated with the content provider.

10. The machine-readable medium of claim 6, wherein the metadata inscribed on the selected image comprises a name associated with the content provider.

11. A data processing system, comprising:
a processor; and
a memory coupled to the processor to store instructions, which when executed by the processor, cause the processor to perform operations of matching images with content items, the operations including
receiving a content item including text, that was identified in response to a search query received from a client,
searching in an image store using an image selection algorithm which is a part of a set of image matching rules, based on one or more keywords associated with the search query to identify a list of one or more image candidates, including ranking each of the identified image candidates, wherein the set of image matching rules includes a keyword-to-image image mapping table, wherein each mapping entry maps one or more keywords to one or more image identifiers,
selecting one of the identified image candidates to be matched with the content item by selecting an image from the identified image candidates which is ranked above a predetermined threshold, the selected image serving as a background image to the text of the content item,
performing a lookup operation in a content provider to metadata (content provider/metadata) mapping table based on a content provider identifier identifying the content provider to identify metadata to be inscribed, wherein the content provider/metadata mapping table comprises a plurality of mapping entries, each mapping entry mapping a content provider ID to a set of metadata to be inscribed on an image to be matched with a content item provided by the corresponding content provider;
inscribing the metadata on the selected image to generate a customized image, the metadata including information describing a content provider that provides the content item, wherein the inscribed metadata is preselected or specified by the content provider, which is stored as a part of the set of image matching rule, and
incorporating the content item with the customized image to generate a composite content item to be transmitted to the client.

12. The system of claim 11, wherein selecting one of the identified images to be matched with the content item is performed further based on one or more keywords that are associated with the content item or the content provider.

13. The system of claim 11, wherein the metadata inscribed on the selected image comprises a logo of the content provider.

14. The system of claim 11, wherein the metadata inscribed on the selected image comprises a predetermined phrase or sentence associated with the content provider.

15. The system of claim 11, wherein the metadata inscribed on the selected image comprises a name associated with the content provider.

* * * * *